US006848348B2

(12) United States Patent
Liao

(10) Patent No.: US 6,848,348 B2
(45) Date of Patent: Feb. 1, 2005

(54) WOOD LATHE WITH A COOLING FAN

(75) Inventor: Juei-Seng Liao, No. 295, Sec. 1, Nanking E. Rd., Taichung City (TW)

(73) Assignee: Juei-Seng Liao, Taichung (TW)

( * ) Notice: Subject to any disclaimer, the term of this patent is extended or adjusted under 35 U.S.C. 154(b) by 0 days.

(21) Appl. No.: 10/623,889

(22) Filed: Jul. 21, 2003

(65) Prior Publication Data

US 2004/0149094 A1 Aug. 5, 2004

Related U.S. Application Data

(63) Continuation-in-part of application No. 10/098,662, filed on Mar. 15, 2002, now abandoned.

(51) Int. Cl.[7] .............................................. B23B 19/02
(52) U.S. Cl. ............................. 82/142; 82/147; 82/173; 474/93; 165/48.1
(58) Field of Search .......................... 82/142, 147, 152, 82/173; 474/93; 165/48.1, 58, 59

(56) References Cited

U.S. PATENT DOCUMENTS

| 1,961,546 | A |   | 6/1934  | Benson |
| 2,055,651 | A |   | 9/1936  | Burrell |
| 2,205,975 | A |   | 6/1940  | Heyer |
| 2,358,088 | A |   | 9/1944  | Lange |
| 3,007,501 | A |   | 11/1961 | Mundell et al. |
| 4,422,498 | A |   | 12/1983 | Chen |
| 4,829,861 | A | * | 5/1989  | Brown et al. ................ 82/142 |
| 4,865,576 | A |   | 9/1989  | Hwang et al. |
| 5,062,330 | A | * | 11/1991 | Trautmann et al. .......... 82/147 |
| 5,914,881 | A | * | 6/1999  | Trachier ..................... 700/160 |
| 6,651,536 | B1| * | 11/2003 | Binnie ........................ 82/122 |

* cited by examiner

Primary Examiner—Willmon Fridie, Jr.
(74) Attorney, Agent, or Firm—Webb Ziesenheim Logsdon Orkin & Hanson, P.C.

(57) ABSTRACT

A wood lathe includes a bed, a headstock mounted on the bed and having a headstock housing, a motor mounted in the headstock housing and having a driving shaft with opposite first and second output ends, a spindle journalled to the headstock housing, a first transmission interconnecting the first output end and the spindle, a cooling fan disposed in the headstock housing for cooling the motor and including a driven shaft that is journalled to the headstock housing, and a second transmission interconnecting the second output end and the driven shaft. The cooling fan delivers airflow toward an annular outer area of the motor in a transverse direction relative to a rotation axis of the driving shaft.

5 Claims, 9 Drawing Sheets

US 6,848,348 B2

WOOD LATHE WITH A COOLING FAN

CROSS-REFERENCE TO RELATED APPLICATION

This application is a continuation-in-part (CIP) of U.S. patent application Ser. No. 10/098,662, filed on Mar. 15, 2002, and abandoned as of the filing date of this application.

BACKGROUND OF THE INVENTION

1. Field of the Invention

This invention relates to a wood lathe, more particularly to a wood lathe with a cooling fan and an airflow guide for cooling a motor in a headstock housing of the wood lathe.

2. Description of the Related Art

FIGS. 1 and 2 illustrate a conventional wood lathe that is disclosed in U.S. Pat. No. 4,865,576 and that includes a headstock 10 with a motor 12 and a spindle 11 driven by the motor 12 through a belt-and-pulley unit 13. The motor 12 is mounted in the headstock 10, and has a driving shaft 121 with opposite first and second output ends. The first output end of the driving shaft 121 is parallel to and is connected to the spindle 11 through the belt-and-pulley unit 13. A cooling fan 14 has a driven shaft coaxially connected to the second output end of the driving shaft 121 so as to cool the motor 12 upon rotation of the driving shaft 121.

The aforesaid wood lathe is disadvantageous in that since the cooling fan 14 is coaxially mounted on the second output end of the driving shaft 121, only an axial end of the motor 12 can be cooled by the cooling fan 14. As such, the cooling effect for the motor 12 is not satisfactory.

FIGS. 3 and 4 illustrate another conventional wood lathe that is disclosed in U.S. Pat. No. 2,055,651 and that includes a headstock 20 with a belt-and-pulley unit 21 and other movable parts mounted thereon. A U-shaped tubular member 22 is mounted on the headstock 20, and is filled with a fluid therein. A fan 23 is connected to the tubular member 22 for circulating the fluid in the tubular member 22. The headstock 20 defines a plurality of passages 200 that are filled with cooling fluid. Heat transfer from the cooling fluid in the passages 200 through inner walls 201, 202 to the fluid in the tubular member 22 takes place for cooling a lubricant chamber in the headstock 20, thereby preventing wearing and distortion of the movable parts.

The aforesaid conventional wood lathe is disadvantageous in that since the inner walls 201, 202 form a heat barrier to the aforesaid heat transfer, the cooling effect on the lubricant chamber is insufficient.

SUMMARY OF THE INVENTION

The object of the present invention is to provide a wood lathe with a motor and a cooling fan that is capable of overcoming the aforesaid drawbacks of the prior art.

According to the present invention, a wood lathe comprises: a bed; a headstock mounted on the bed and having a headstock housing; a motor mounted securely in the headstock housing and having two axial ends and an annular outer area that extends between the axial ends, the motor including a driving shaft with opposite first and second output ends that project outwardly and axially from the axial ends of the motor, respectively; a spindle rotatably journalled to the headstock housing and parallel to the driving shaft; a first transmission unit interconnecting the first output end of the driving shaft and the spindle so as to permit co-rotation of the spindle with the driving shaft; a cooling fan disposed in the headstock housing adjacent to the motor for cooling the motor, the cooling fan including a driven shaft that is rotatably journalled to the headstock housing and that is parallel to the driving shaft, a plurality of blades projecting outwardly from the driven shaft, and a fan casing coaxially surrounding the driven shaft and the blades, the fan casing having an axially extending peripheral wall that is formed with a first air outlet which is disposed adjacent to and which opens toward the annular outer area of the motor in a transverse direction relative to a rotation axis of the driven shaft so as to direct airflow toward the annular outer area of the motor upon rotation of the driven shaft; and a second transmission unit interconnecting the second output end of the driving shaft and the driven shaft so as to permit co-rotation of the driven shaft with the driving shaft.

BRIEF DESCRIPTION OF THE DRAWINGS

In drawings which illustrate an embodiment of the invention.

DETAILED DESCRIPTION OF THE PREFERRED EMBODIMENT

Figure 1:
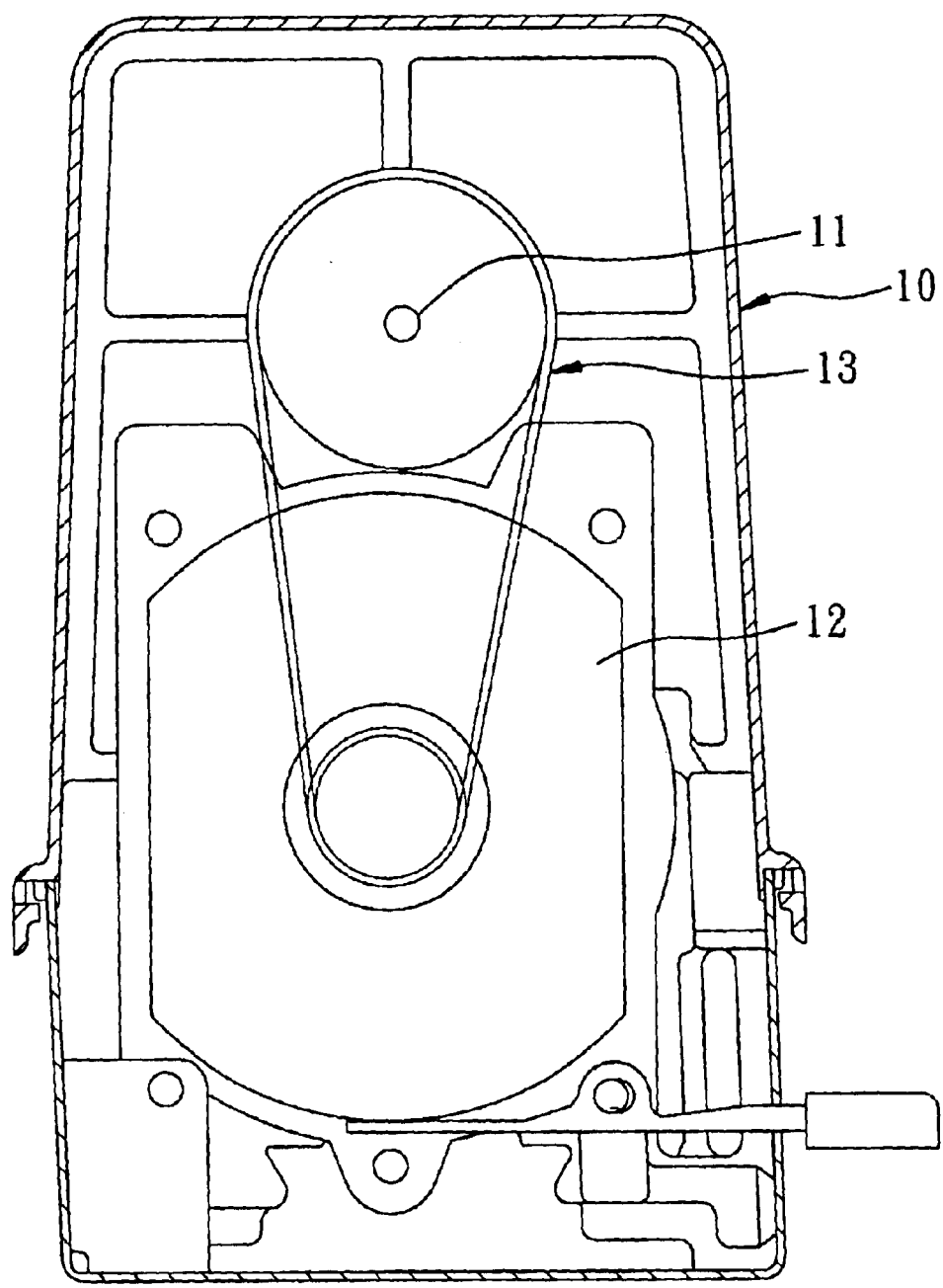
FIG. 1 is a fragmentary, sectional view of a conventional wood lathe.
Figure 2:
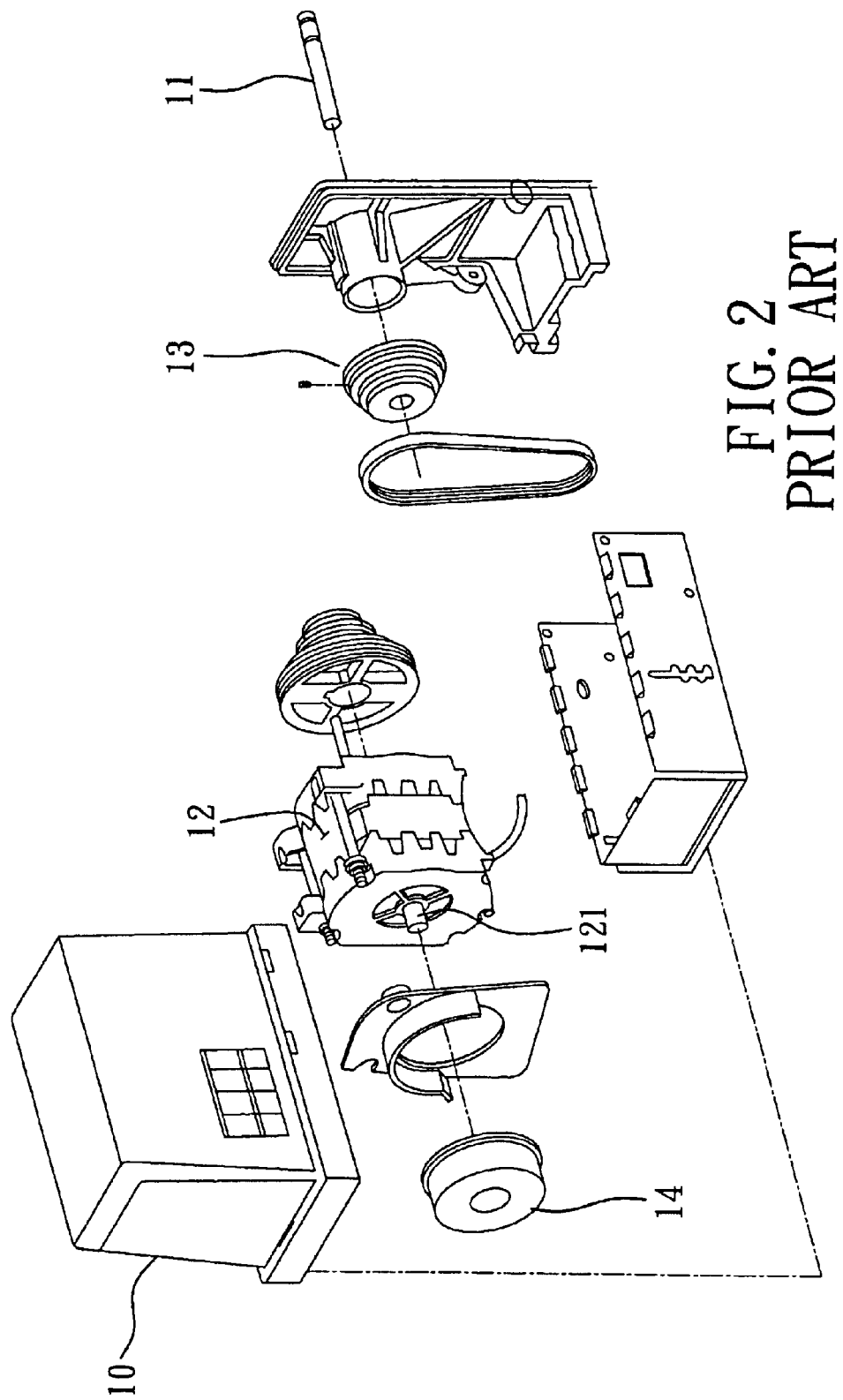
FIG. 2 is a fragmentary, exploded perspective view of the wood lathe of FIG. 1.
Figure 3:
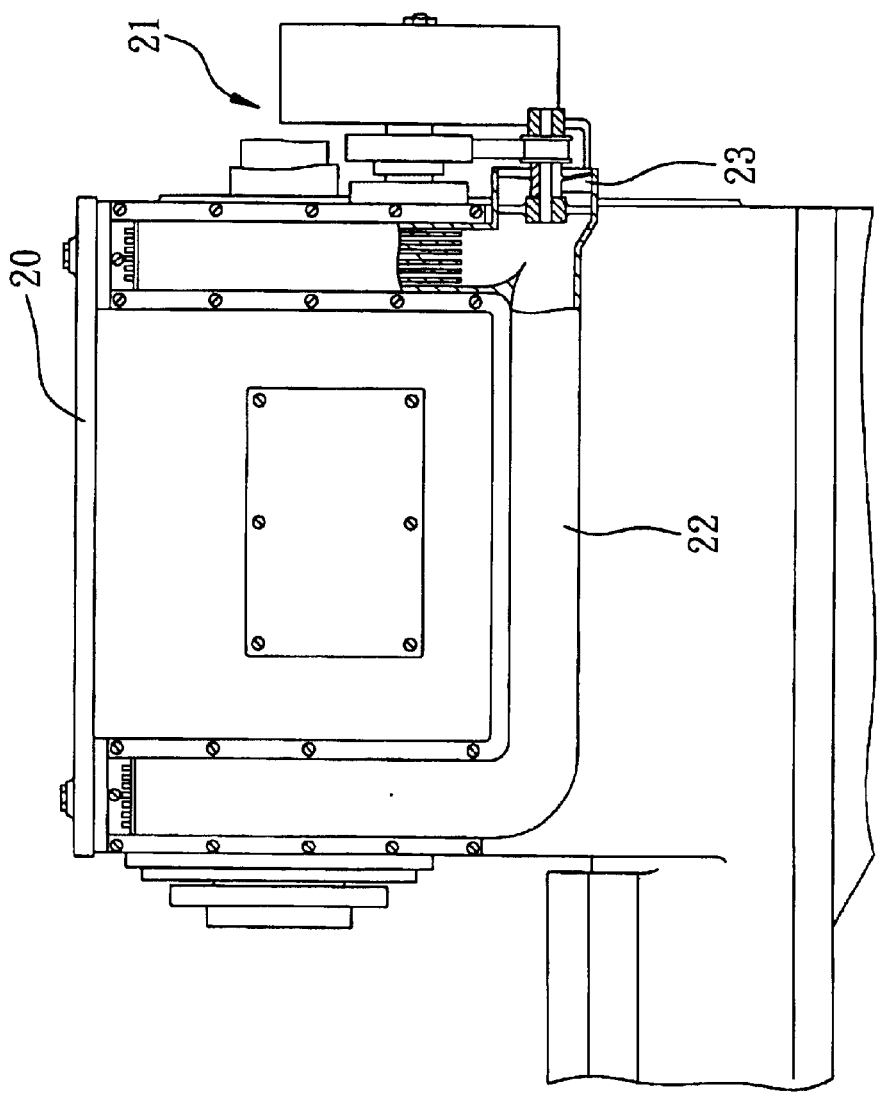
FIG. 3 is a fragmentary, schematic side view of another conventional wood lathe.
Figure 4:
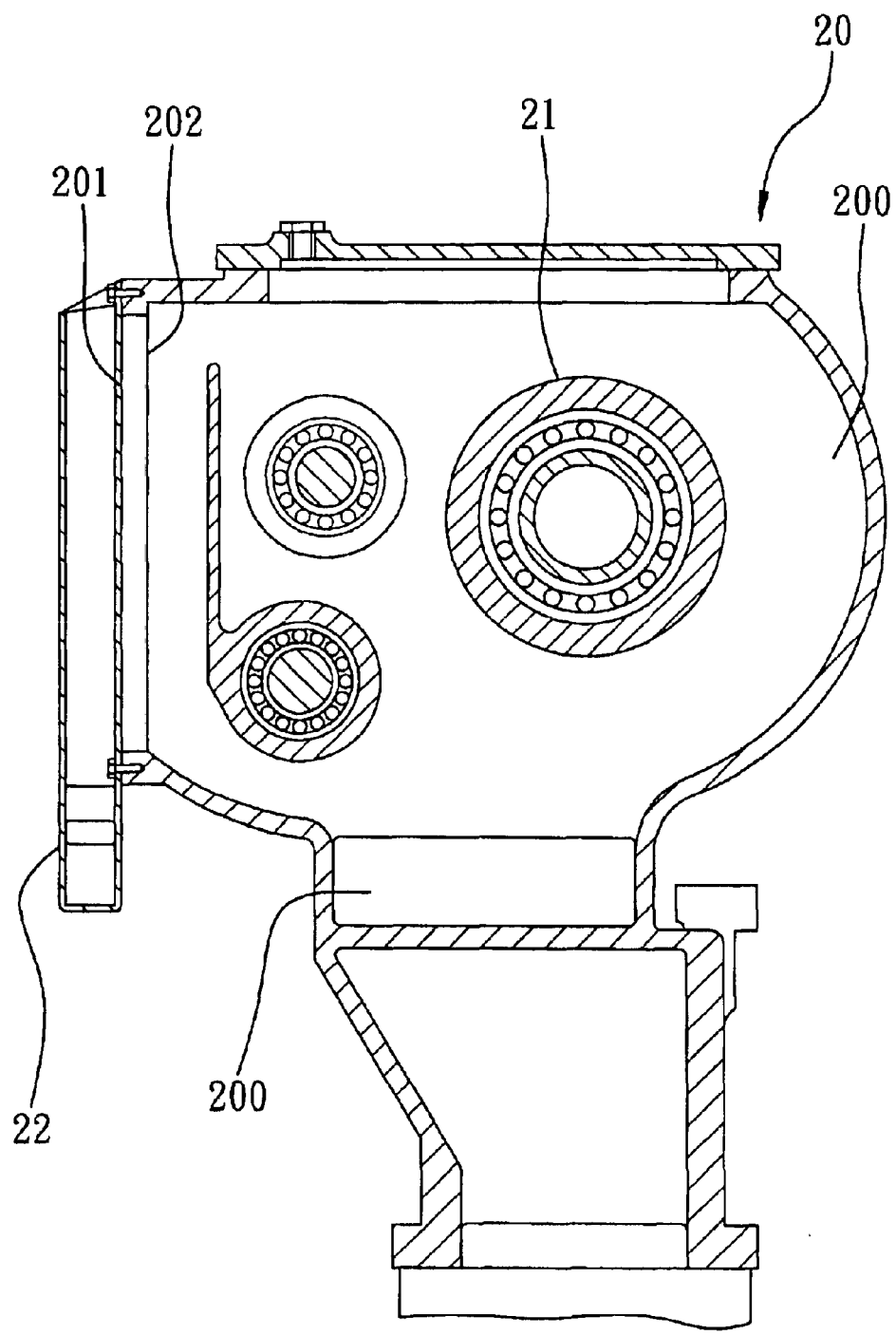
FIG. 4 is a fragmentary, sectional side view of the wood lathe of FIG. 3.
Figure 5:
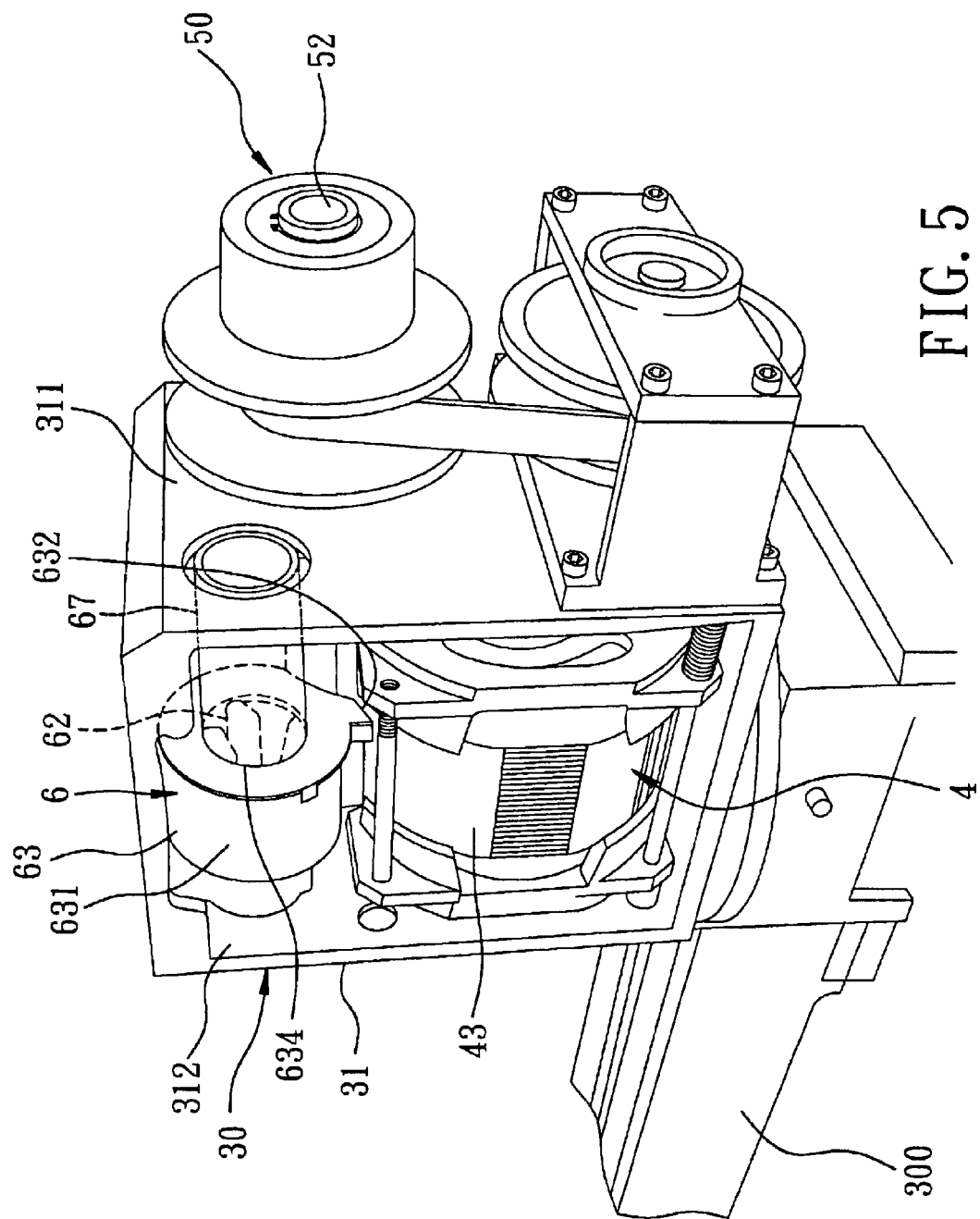
FIG. 5 is a fragmentary perspective view of a wood lathe embodying this invention.
Figure 6:
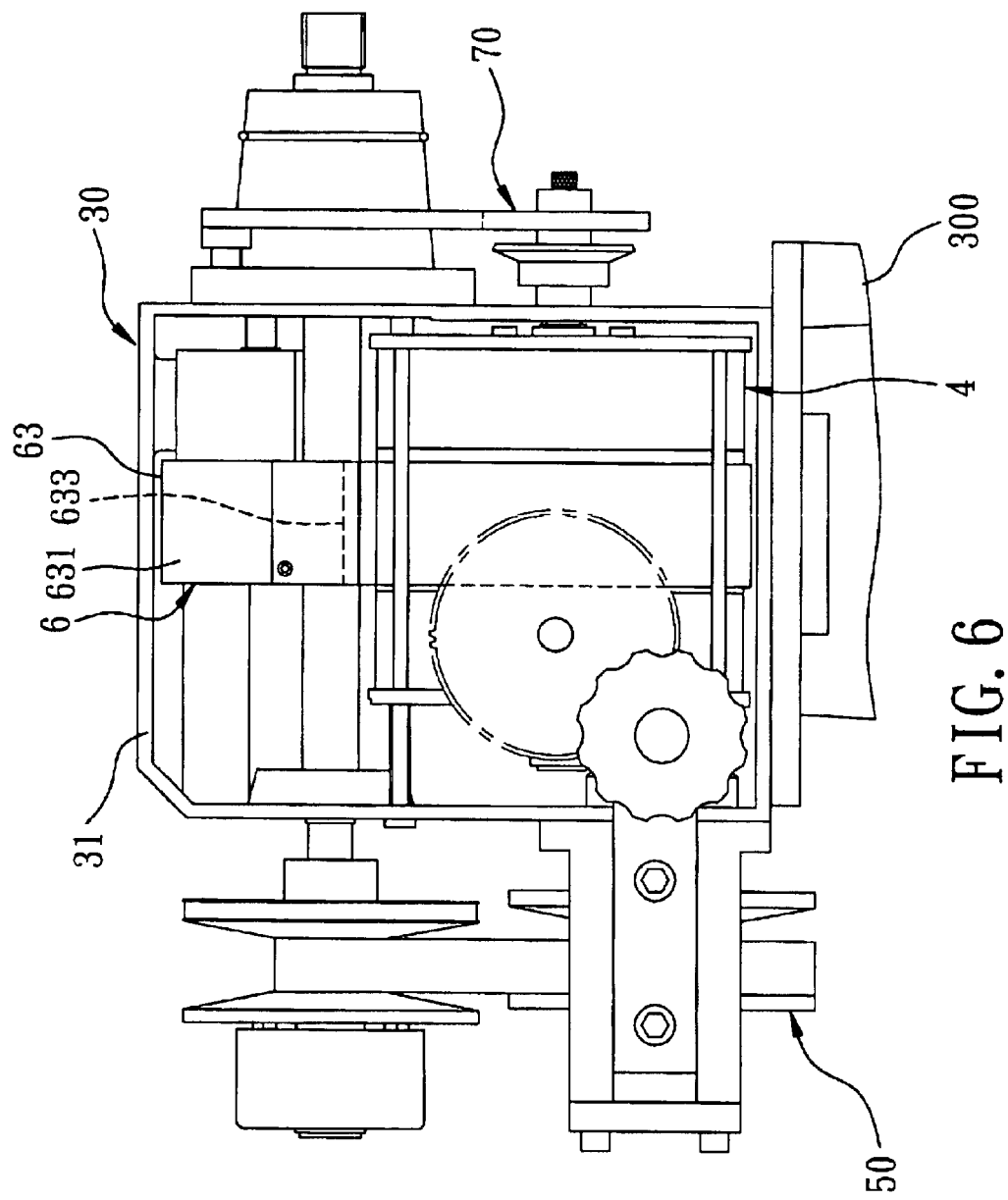
FIG. 6 is a fragmentary front view of the wood lathe of FIG. 5.
Figure 7:
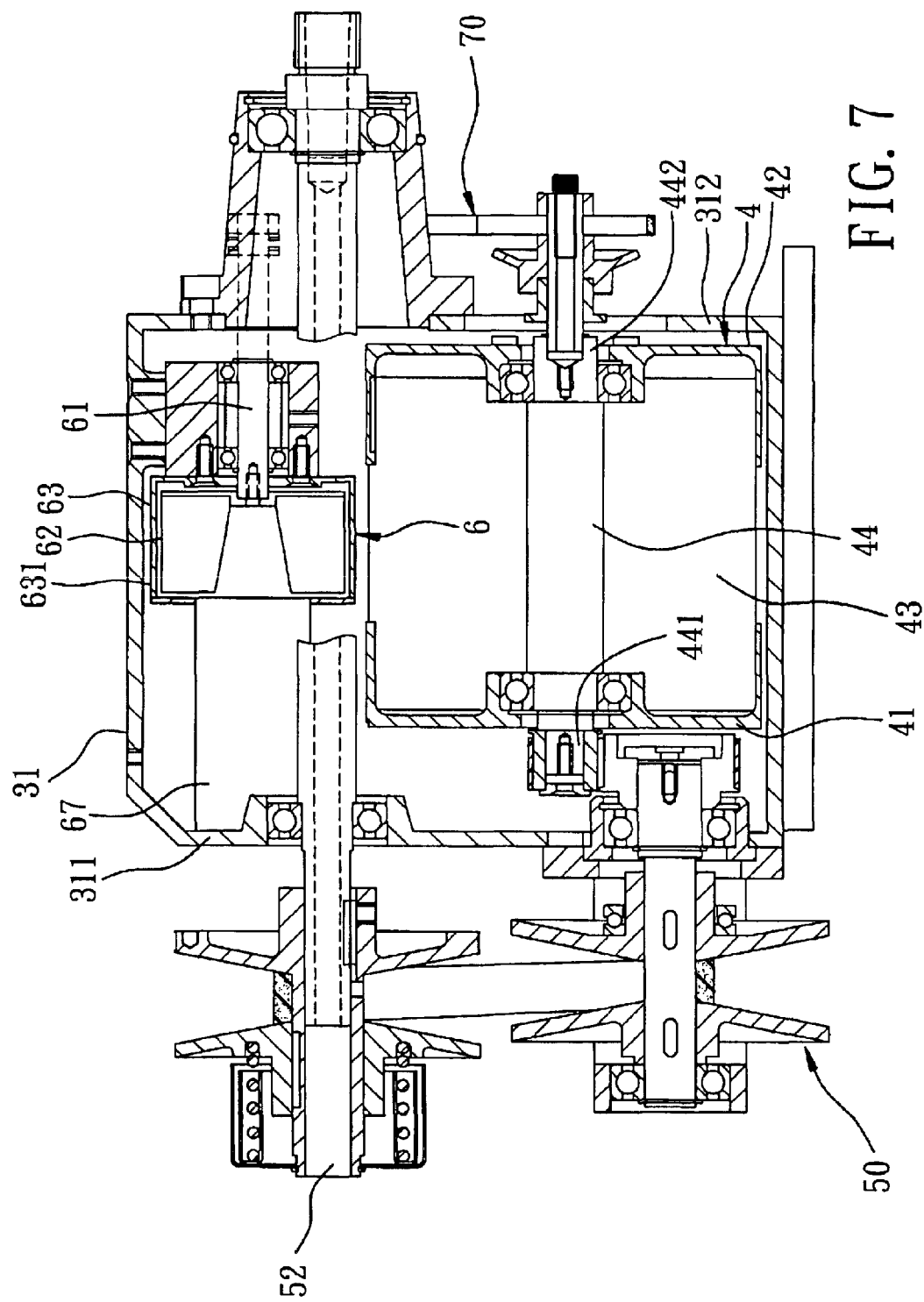
FIG. 7 is a fragmentary sectional view of the wood lathe of FIG. 5.
Figure 8:
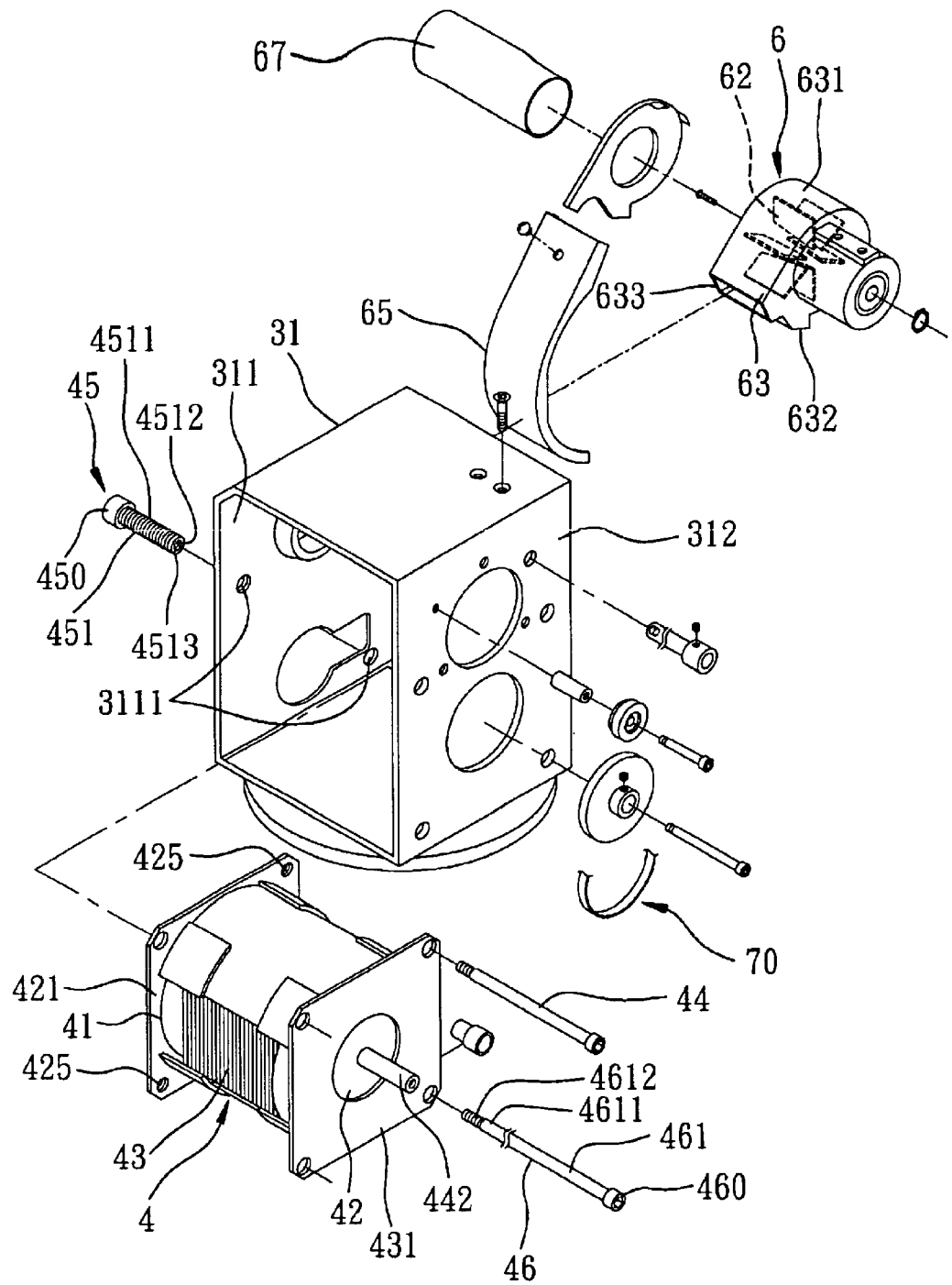
FIG. 8 is an exploded perspective view of a headstock housing, a motor, and a cooling fan of the wood lathe of FIG. 5.
Figure 9:
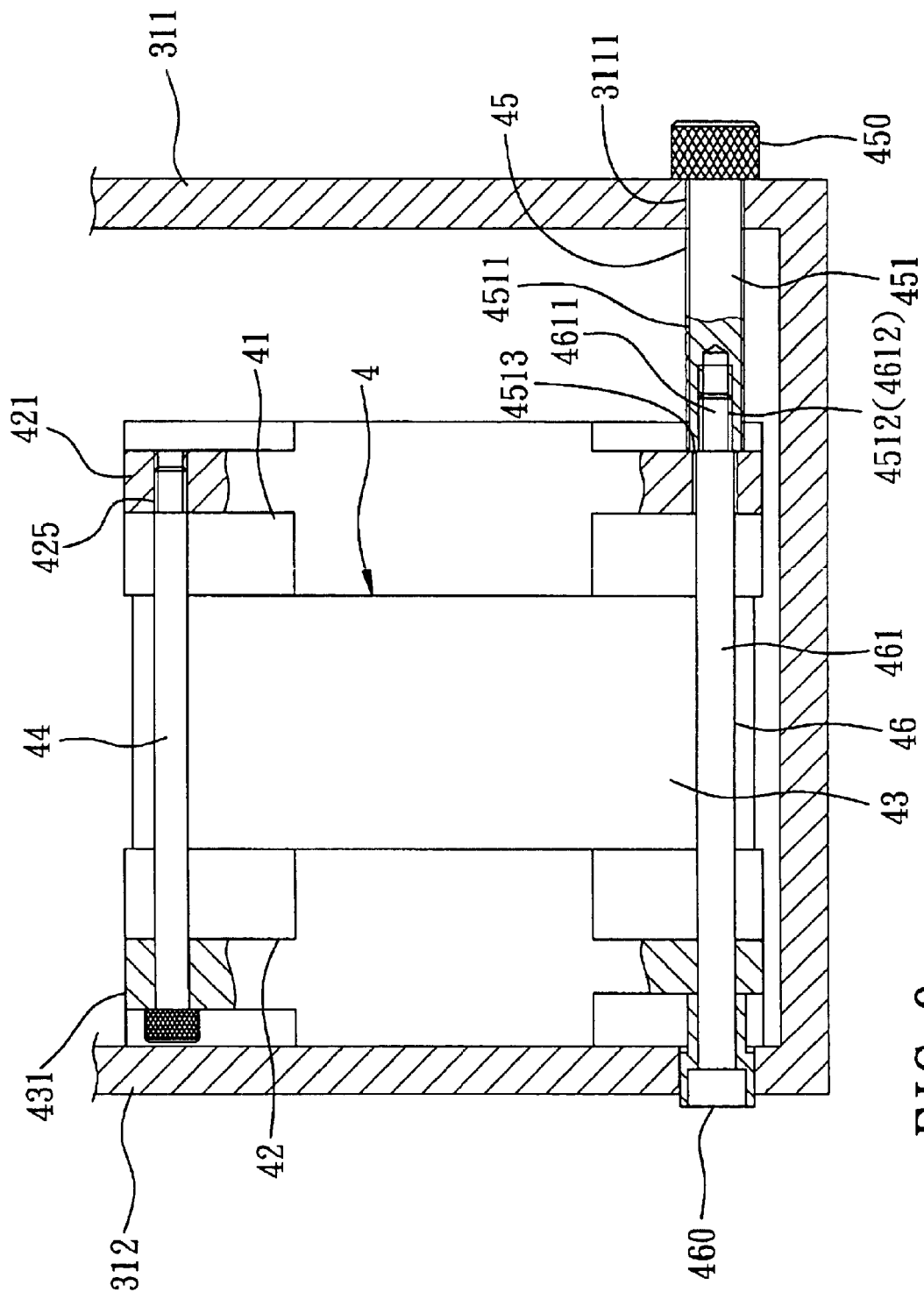
FIG. 9 is a fragmentary partly sectional view to illustrate how the motor is secured to the headstock housing of the wood lathe of FIG. 5.

FIGS. 5 to 9 illustrate a preferred embodiment of a wood lathe of this invention for machining a wooden workpiece (not shown).

The wood lathe includes: a bed 300 (only a portion of the bed 300 is shown); a headstock 30 mounted on the bed 300 and having a headstock housing 31; a motor 4 mounted securely in the headstock housing 31 and having two axial ends 41, 42 and an annular outer area 43 that extends between the axial ends 41, 42, the motor 4 including a driving shaft 44 with opposite first and second output ends 441, 442 that project outwardly and axially from the axial ends 41, 42, respectively; a spindle 52 rotatably journalled to the headstock housing 31 and parallel to the driving shaft 44; a first transmission unit 50, such as a belt-and-pulley assembly, interconnecting the first output end 441 of the driving shaft 44 and the spindle 52 so as to permit co-rotation of the spindle 52 with the driving shaft 44; a cooling fan 6 disposed in the headstock housing 31 adjacent to the motor 4 for cooling the motor 4, the cooling fan 6 including a driven shaft 61 that is rotatably journalled to the headstock housing 31 and that is parallel to the driving shaft 44, a plurality of blades 62 projecting outwardly from the driven shaft 61, and a fan casing 63 coaxially surrounding the driven shaft 61 and the blades 62, the fan casing 63 having an axially extending peripheral wall 631 that is formed with a first air outlet 632 which is disposed adjacent to and which opens toward the annular outer area 43 of the motor 4 in a transverse direction relative to a rotation axis of the driven shaft 61 so as to direct airflow toward the annular outer area 43 of the motor 4 upon rotation of the driven shaft 61; and a second transmission unit 70, such as a belt-and-pulley assembly, interconnecting the second output end 442 of the driving shaft 44 and the driven shaft 61 so as to permit co-rotation of the driven shaft 61 with the driving shaft 44.

Preferably, the first air outlet 632 is disposed above and confronts a top side of the annular outer area 43 of the motor 4 so as to direct airflow thereto upon rotation of the driven shaft 61. The peripheral wall 631 of the fan casing 63 is annular in shape, and is further formed with a second air outlet 633 that is disposed above and angularly spaced apart from the first air outlet 632, and that opens downwardly. The wood lathe further includes an airflow guide that includes a curved plate 65 secured to the peripheral wall 631, extending downwardly and curvedly from the second air outlet 633, and circumferentially surrounding one side of the annular outer area 43 of the motor 4 between the top side of the annular outer area 43 and a bottom side of the annular outer area 43.

The fan casing 63 is formed with an air inlet 634 at an axial end thereof. The cooling fan 6 further includes a tube 67 that extends outwardly and axially from the air inlet 634 through the headstock housing 31 so as to permit introduction of fresh air into the headstock housing 31 upon rotation of the driven shaft 61.

The headstock housing 31 includes a pair of rectangular first and second mounting walls 311, 312 that respectively confront the axial ends 41, 42 of the motor 4. The first mounting wall 311 is formed with a pair of diagonally disposed threaded holes 3111. The wood lathe further includes a motor-fastening unit that includes a pair of rectangular first and second fastening plates 421, 431 respectively attached to the axial ends 41, 42 of the motor 4 and disposed between and respectively confronting the first and second mounting walls 311, 312, a pair of first screw rods 45, and a pair of second screw rods 46. Each of the first screw rods 45 has an enlarged head 450 and a shank 451 that is formed with an outer thread 4511 and an inner thread 4512 and that has an abutting end 4513 opposite to the enlarged head 450. Each of the first screw rods 45 extends through the first mounting wall 311, and threadedly engages a respective one of the threaded holes 3111 in the first mounting wall 311 in such a manner that the enlarged head 450 is disposed at an outer side of the first mounting wall 311 and that the abutting end 4513 is disposed between the first mounting wall 3111 and the first fastening plate 421 and adjacent to the first fastening plate 421. Each of the second screw rods 46 has an enlarged head 460 and a shank 461 having a tail 4611 formed with an outer thread 4612. Each of the second screw rods 46 extends through the first and second fastening plates 421, 431 in such a manner that the enlarged head 460 thereof is disposed at an outer side of the second fastening plate 431 and that the tail 461 thereof extends through the first fastening plate 421 to threadedly engage the inner thread 4513 of the shank 451 of a respective one of the first screw rods 45, thereby ensuring abutment of the enlarged head 450 of each of the first screw rods 45 against the first mounting wall 311, abutment of the abutting end 4513 of the shank 451 of each of the first screw rods 45 against the first fastening plate 421, and abutment of the enlarged head 460 of each of the second screw rods 46 against the second fastening plate 431 upon tightening of each of the first screw rods 45 relative to the respective one of the second screw rods 46 so as to secure the motor 4 to the headstock housing 31. The first fastening plate 421 is formed with a pair of diagonally disposed threaded holes 425. The motor-fastening unit further includes a pair of third screw rods 44, each of which extends through the second fastening plate 431 and threadedly engages a respective one of the threaded holes 425 in the first fastening plate 421.

With the inclusion of the cooling fan 6 and the curved plate 65 of the airflow guide in the wood lathe of this invention, and with the arrangement of the first and second air outlets 632, 633 opening toward the annular outer area 43 of the motor 4, the cooling effect for the motor 4 can be enhanced, and the drawbacks as encountered in the prior art can be eliminated.

With the invention thus explained, it is apparent that various modifications and variations can be made without departing from the spirit of the present invention. It is therefore intended that the invention be limited only as recited in the appended claims.

I claim:

1. A wood lathe comprising:

a bed;

a headstock mounted on said bed and having a headstock housing;

a motor mounted securely in said headstock housing and having two axial ends and an annular outer area that extends between said axial ends, said motor including a driving shaft with opposite first and second output ends that project outwardly and axially from said axial ends of said motor, respectively;

a spindle rotatably journalled to said headstock housing and parallel to said driving shaft;

a first transmission unit interconnecting said first output end of said driving shaft and said spindle so as to permit co-rotation of said spindle with said driving shaft;

a cooling fan disposed in said headstock housing adjacent to said motor for cooling said motor, said cooling fan including a driven shaft that is rotatably journalled to said headstock housing and that is parallel to said driving shaft, a plurality of blades projecting outwardly from said driven shaft, and a fan casing coaxially surrounding said driven shaft and said blades, said fan casing having an axially extending peripheral wall that is formed with a first air outlet which is disposed adjacent to and which opens toward said annular outer area of said motor in a transverse direction relative to a rotation axis of said driven shaft so as to direct airflow toward said annular outer area of said motor upon rotation of said driven shaft; and a second transmission unit interconnecting said second output end of said driving shaft and said driven shaft so as to permit co-rotation of said driven shaft with said driving shaft.

2. The wood lathe of claim 1, wherein said annular outer area of said motor has top and bottom sides, said first air outlet being disposed above and confronting said top side of said annular outer area of said motor so as to direct airflow thereto upon rotation of said driven shaft.

3. The wood lathe of claim 2, wherein said peripheral wall of said fan casing is annular in shape and is further formed with a second air outlet that is disposed above and angularly spaced apart from said first air outlet, and that opens downwardly, said wood lathe further comprising an airflow guide that includes a curved plate secured to said peripheral wall, extending downwardly and curvedly from said second air outlet, and circumferentially surrounding one side of said annular outer area of said motor between said top side of said annular outer area and said bottom side of said annular outer area.

4. The wood lathe of claim 3, wherein said fan casing has an axial end formed with an air inlet, said cooling fan further including a tube that extends outwardly and axially from said air inlet through said headstock housing so as to permit introducing of fresh air into said headstock housing upon rotation of said driven shaft.

5. The wood lathe of claim 4, wherein said headstock housing includes a pair of rectangular first and second mounting walls that respectively confront said axial ends of said motor, said first mounting wall being formed with a pair of diagonally disposed threaded holes, said wood lathe further comprising a motor-fastening unit that includes a pair of rectangular first and second fastening plates respectively attached to said axial ends of said motor and disposed between and respectively confronting said first and second mounting walls, a pair of first screw rods, and a pair of second screw rods, each of said first screw rods having an enlarged head and a shank that is formed with an outer thread and an inner thread and that has an abutting end opposite to said enlarged head, each of said first screw rods extending through said first mounting wall and threadedly engaging a respective one of said threaded holes in said first mounting wall in such a manner that said enlarged head is disposed at an outer side of said first mounting wall and that said abutting end is disposed between said first mounting wall and said first fastening plate and adjacent to said first fastening plate, each of said second screw rods having an enlarged head and a shank that has a tail formed with an outer thread, each of said second screw rods extending through said first and second fastening plates in such a manner that said enlarged head thereof is disposed at an outer side of said second fastening plate and that said tail thereof extends through said first fastening plate to threadedly engage said inner thread of said shank of a respective one of said first screw rods, thereby ensuring abutment of said enlarged head of each of said first screw rods against said first mounting wall, abutment of said abutting end of said shank of each of said first screw rods against said first fastening plate, and abutment of said enlarged head of each of said second screw rods against said second fastening plate upon tightening of each of said first screw rods relative to the respective one of said second screw rods.

* * * * *